(12) United States Patent
Kim

(10) Patent No.: US 7,401,676 B2
(45) Date of Patent: Jul. 22, 2008

(54) MOUNTING PORTION STRUCTURE OF PROPELLER SHAFT CENTER BEARING

(75) Inventor: Ki-Chang Kim, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 376 days.

(21) Appl. No.: 11/210,624

(22) Filed: Aug. 24, 2005

(65) Prior Publication Data
US 2007/0045034 A1    Mar. 1, 2007

(51) Int. Cl.
*B60K 17/22* (2006.01)
(52) U.S. Cl. .................................. 180/376; 180/379
(58) Field of Classification Search .............. 180/379, 180/376, 312, 380
See application file for complete search history.

(56) References Cited

U.S. PATENT DOCUMENTS 3,791,472 A * 2/1974 Tatsumi ...................... 180/312
6,435,299 B1 * 8/2002 Miller ......................... 180/381
2005/0061573 A1 * 3/2005 Mizuno et al. ............... 180/376

FOREIGN PATENT DOCUMENTS

| DE | 2908709 C2 | 12/1986 |
| DE | 3832543 A1 | 5/1990 |
| DE | 4233832 C2 | 1/1997 |
| DE | 19954296 C2 | 6/2003 |
| JP | 04230421 A * | 8/1992 |

* cited by examiner

*Primary Examiner*—Faye M. Fleming
(74) *Attorney, Agent, or Firm*—Morgan Lewis & Bockius LLP

(57) ABSTRACT

A mounting portion structure of a propeller shaft center bearing in a Rear-Wheel Drive (RWD) vehicle where the engine power is transmitted to the rear wheels by using the propeller shaft includes a tunnel formed at the center of a center floor panel along the longitudinal direction of the vehicle. A mounting bracket is equipped at the tunnel and is mounted with the center bearing. A pocket groove is formed at the mounting bracket for rendering a closed box with the tunnel, and a pipe nut is equipped at the pocket groove.

4 Claims, 4 Drawing Sheets

MOUNTING PORTION STRUCTURE OF PROPELLER SHAFT CENTER BEARING

CROSS-REFERENCE TO RELATED APPLICATIONS

The present application is based on Korean Patent Application Serial Number 10-2004-0013059, filed on Feb. 26, 2004, the disclosure of which is hereby incorporated by reference herein in its entirety.

FIELD OF THE INVENTION

The present invention relates to a structure for reinforcing local rigidity of a Front-engine Rear-drive (FR) vehicle. More particularly, a structure is disclosed that reinforces the rigidity at the mounting portion of the propeller shaft center bearing.

BACKGROUND OF THE INVENTION

Front-engine Rear-drive (FR) vehicles should have a propeller shaft for transmitting the driving force of the engine to the rear differential. The propeller shaft is generally equipped at the center of the vehicle with a center bearing that is supported by a center portion of the center floor panel of the vehicle body.

Therefore, the mounting portion structure of the center bearing at the center floor panel and the adjacent portions thereof should be designed to have sufficient rigidity to withstand vibration or exciting force (giving rise to the vibration) that can be transmitted from the propeller shaft to the vehicle body.

SUMMARY OF THE INVENTION

Embodiments of the present invention increase the rigidity of the vehicle body at the mounting portion of the propeller shaft center bearing, thereby improving the durability of the vehicle and decreasing the noise thereof.

A mounting portion structure of a propeller shaft center bearing in a Rear-Wheel Drive (RWD) vehicle, where the engine power is transmitted to the rear wheels through a propeller shaft, includes a tunnel formed at the center of a center floor panel along the longitudinal direction of the vehicle. A mounting bracket is equipped at the tunnel and is mounted with the center bearing. A pocket groove is formed at the mounting bracket for rendering a closed box with the tunnel and a pipe nut is equipped at the pocket groove.

The pocket groove of the mounting bracket is preferably equipped with a partition member such that the pocket groove may have a double partition structure. Further, a stay preferably connects both sides of the mounting bracket and thus passes across the tunnel.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
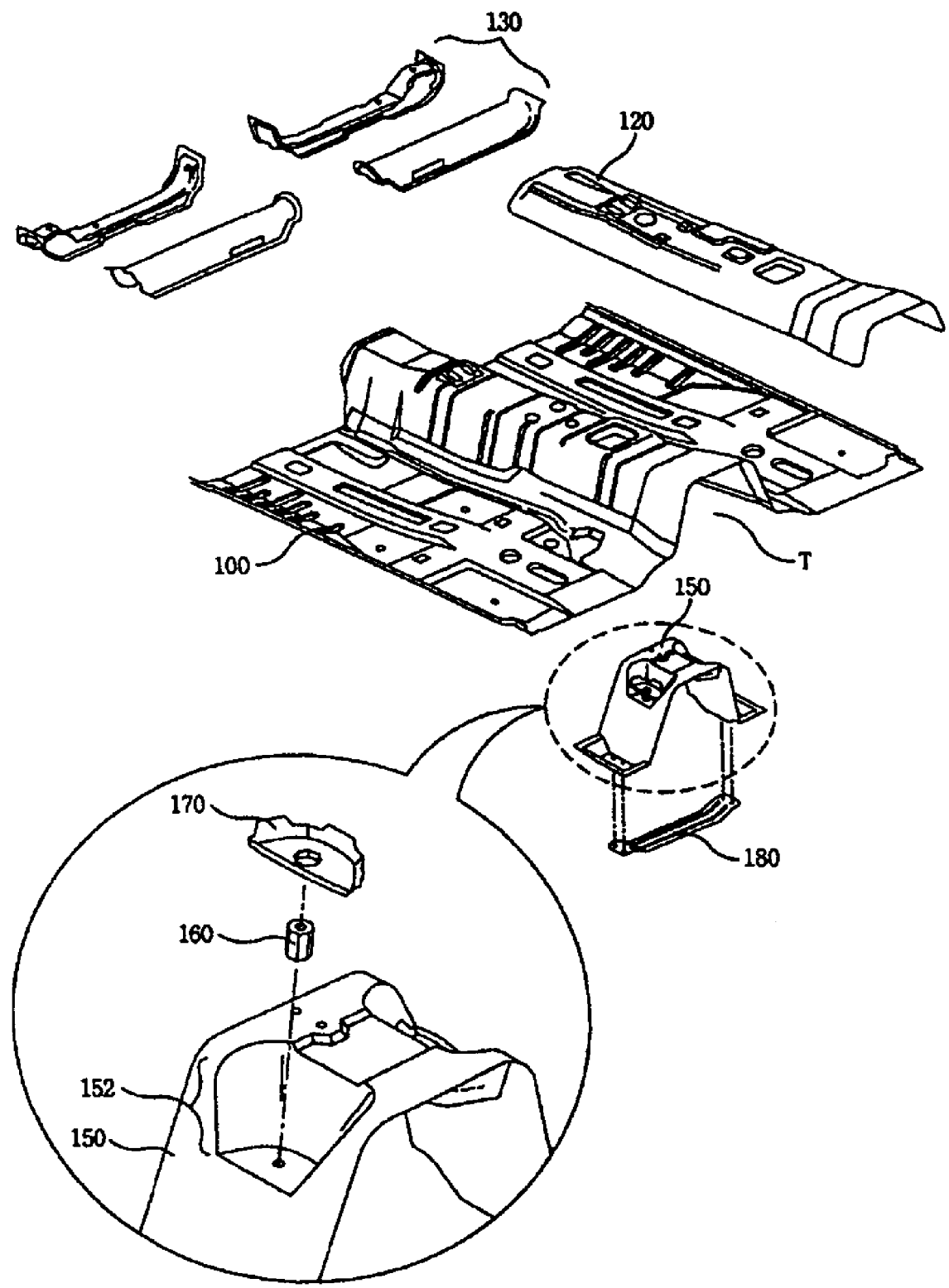
FIG. 1 is a perspective view of a disassembled mounting portion structure for a propeller shaft center bearing according to an embodiment of the present invention.

With reference to FIGS. 1-4, a center floor panel 100 is formed at the center of a vehicle body with a tunnel (T) along the longitudinal direction of the vehicle. A propeller shaft (S) passes through the interior of the tunnel (T). A center bearing (C) of the propeller shaft (S) is affixed to center floor panel 100 via a mounting bracket 150 to thereby support the propeller shaft (S).

The upper surface of the tunnel (T) formed at the center of center floor panel 100 is mounted with a reinforcement 120 along the longitudinal direction of the vehicle. Mounting bracket 150 is mounted where the center bearing (C) is mounted. A stay 180 connects both ends of mounting bracket 150 and thus passes across the tunnel (T). Both upper sides of center floor panel 100 are equipped with front seat crossmembers 130 in h direction of the vehicle. This increases the rigidity of center floor panel 100 in the vehicular lateral direction.

Mounting bracket 150 forms, at the center thereof, an upwardly protruding trapezoid cross-section for being inserted into the tunnel (T). Pocket grooves 152 are symmetrically formed at both upper sides of the trapezoid. Both ends of mounting bracket 150 are equipped, respectively, with a flange coupled to center floor panel 100. Under this structure, the longitudinal direction of the tunnel (T) and the longitudinal direction of mounting bracket 150 perpendicularly intersect each other at center floor panel 100.

Figure 2:
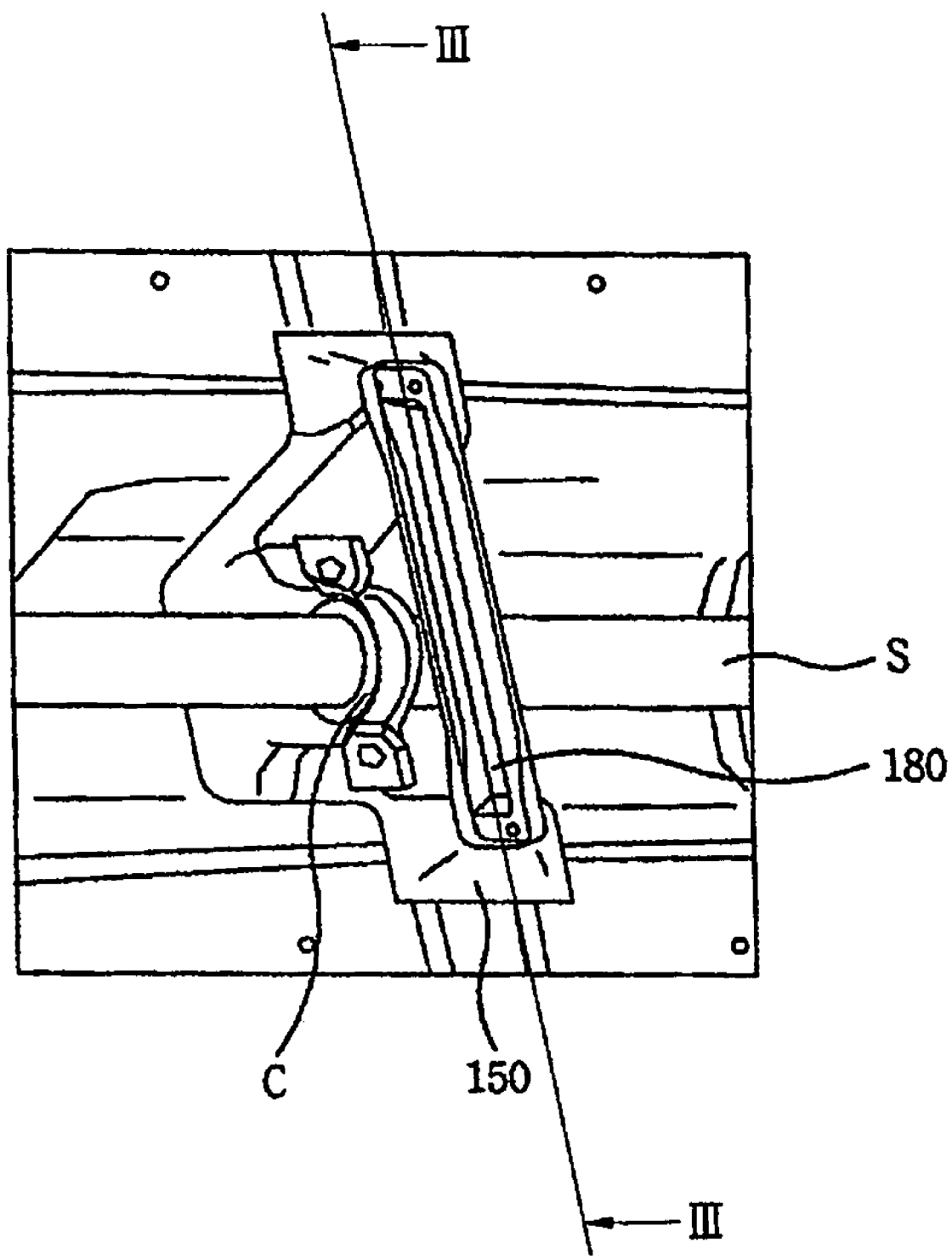
FIG. 2 is a perspective view of an assembled mounting portion structure for a propeller shaft center bearing when observed from a bottom thereof according to an embodiment of the present invention.

In reference to FIG. 2, the center bearing (C) that supports the propeller shaft (S) is coupled to mounting bracket 150 via a coupling bolt. Mounting bracket 150 installed with stay 180 connects both sides of the tunnel (T). When mounting bracket 150 is attached to the interior of the tunnel (T), pocket groove 152 and the interior of the tunnel (T) form a box-shaped space having a closed cross-section. Further, pocket groove 152 is installed with a pipe nut 160 for coupling with the center bearing (C), and a partition member 170 for rendering a double partition structure at the mounting portion of the center bearing (C) by horizontally dividing the interior of pocket groove 152 into two rooms. The double partition structure increases the rigidity of the mounting portion of the center bearing (C), thereby being efficient to decrease noise as well as vibration.

Figure 3:
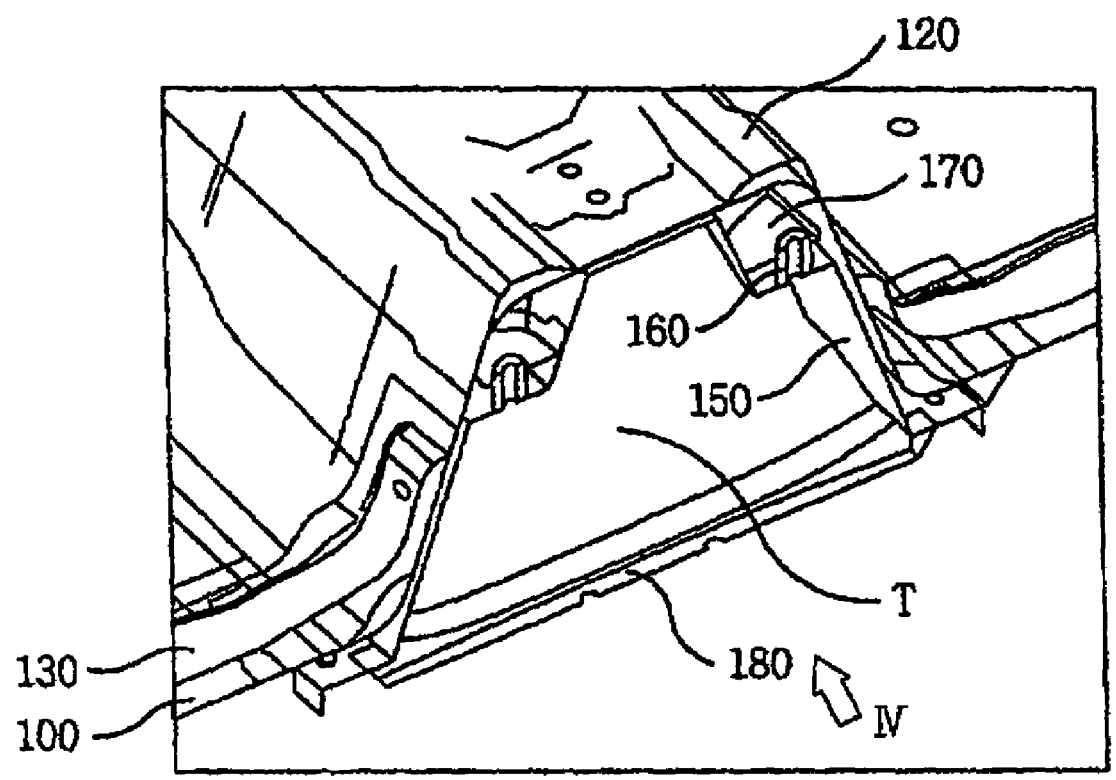
FIG. 3 is a cross-sectional view of a mounting portion structure for a propeller shaft center bearing according to an embodiment of the present invention.
Figure 4:
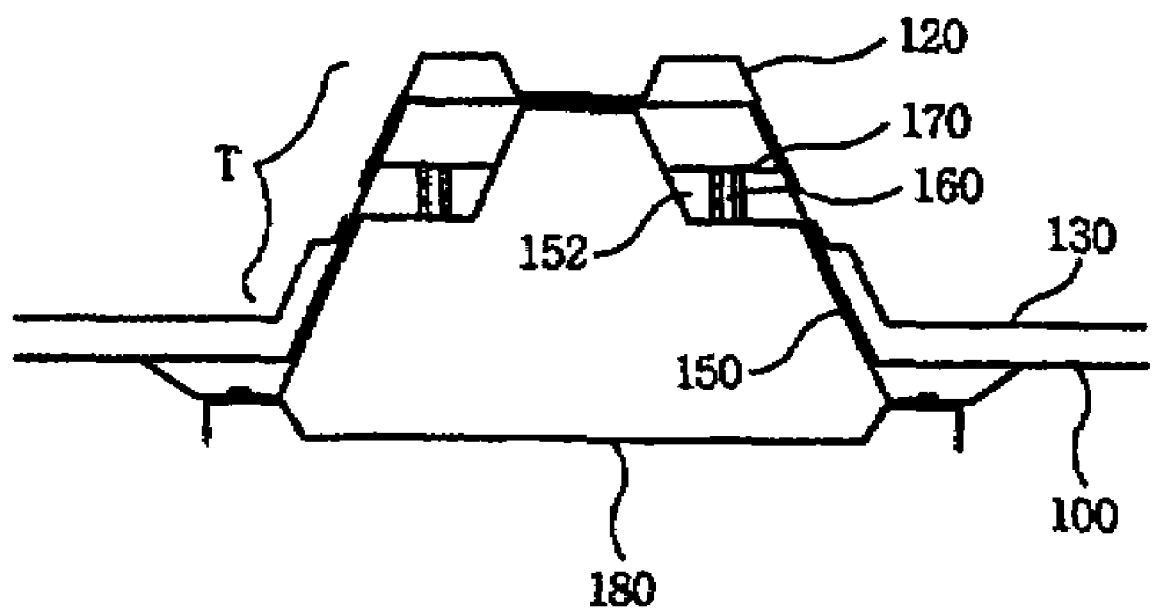
FIG. 4 is a cross-sectional view schematically illustrating a mounting portion structure of a propeller shaft center bearing according to an embodiment of the present invention.

Referring to FIGS. 3 and 4, the tunnel (T) into which the propeller shaft (S) penetrates is strengthened in rigidity by reinforcement 120 and mounting bracket 150, each at the upper and lower portions of the tunnel (T). Also, mounting bracket 150 is formed with pocket grooves 152 such that pocket grooves 152 provide a closed-box structure by being coupled with the interior of the tunnel (T).

The interior of pocket groove 152 may preferably be divided into two compartments by installing partition member 170 in the horizontal direction. The lower space among the above structure is mounted with pipe nut 160. Thus, when a mounting bolt for the center bearing is coupled to pipe nut 160, the space from the mounting portion to the interior of the vehicle is doubly insulated via center floor panel 100 and reinforcement 120. In addition, both sides of the tunnel (T) are connected by stay 180, thus preventing any contraction and expansion of the tunnel (T) due to the vibration or exterior load.

As apparent from the foregoing, both sides of the tunnel (T) formed at the center of the center floor panel are connected by a stay, thereby preventing the contraction and expansion of the tunnel, reducing local vibration of the tunnel, and increasing the rigidity of the mounting portion of the center bearing For increasing the local rigidity of the mounting portion of the center bearing, a bent-shaped mounting bracket is equipped underneath the front seat crossmember, thus increasing the rigidity efficiency of the above mounting portion by forming a box at each upper and lower surface of the panel. Accordingly, the center floor tunnel in the present invention is reinforced by using the double partition structure and stay, resulting in a reduction of the noise of the vehicle compartment and an improvement of the durability the vehicle.

What is claimed is:

1. A mounting portion structure of a propeller shaft center bearing in a Rear-Wheel Drive vehicle where the engine power is transmitted to the rear wheels by using the propeller shaft, comprising:
   a tunnel formed at a center of a center floor panel along a longitudinal direction of a vehicle;
   a mounting bracket equipped at said tunnel and mounted with said center bearing;
   a pocket groove formed at said mounting bracket for rendering a closed box with said tunnel, said pocket groove comprising a partition member whereby said pocket groove may have a double partition structure; and
   a pipe nut installed at said pocket groove.

2. A mounting portion structure of a propeller shaft center bearing in a Rear-Wheel Drive vehicle where the engine power is transmitted to the rear wheels by using the propeller shaft, comprising:
   a tunnel formed at a center of a center floor panel along a longitudinal direction of a vehicle;
   a mounting bracket equipped at said tunnel and mounted with said center bearing;
   a pocket groove formed at said mounting bracket for rendering a closed box with said tunnel; and
   a pipe nut installed at said pocket groove;
   wherein said mounting bracket forms at the center thereof an upwardly protruded trapezoid cross-section for being inserted into said tunnel, wherein said pocket grooves are symmetrically formed at both upper sides of the trapezoid, wherein both ends of said mounting bracket are respectively equipped with a flange coupled to said center floor panel, and the longitudinal direction of said tunnel and the longitudinal direction of said mounting bracket perpendicularly intersect each other at said center floor panel.

3. The structure as defined in claim 1, wherein a stay is further equipped to connect both sides of said mounting bracket and to thereby pass across said tunnel.

4. The structure as defined in claim 2, wherein a stay is further equipped to connect both sides of said mounting bracket and to thereby pass across said tunnel.

* * * * *